(12) United States Patent
Lin et al.

(10) Patent No.: US 11,632,624 B2
(45) Date of Patent: Apr. 18, 2023

(54) AUDIO OUTPUT DEVICE AND ELECTRONIC DEVICE COMPRISING THE SAME

(71) Applicant: Qisda Corporation, Taoyuan (TW)

(72) Inventors: Chih-Hung Lin, Taoyuan (TW); Hsun-Cheng Cho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 10 days.

(21) Appl. No.: 17/510,492

(22) Filed: Oct. 26, 2021

(65) Prior Publication Data

US 2022/0132237 A1    Apr. 28, 2022

(30) Foreign Application Priority Data

Oct. 27, 2020    (CN) .......................... 202011167382.9

(51) Int. Cl.
*H04R 1/32* (2006.01)
*G06F 1/18* (2006.01)

(52) U.S. Cl.
CPC ............. *H04R 1/323* (2013.01); *G06F 1/181* (2013.01)

(58) Field of Classification Search
CPC ... H04R 1/02; H04R 1/22; H04R 1/32; H04R 1/323; H04R 1/34; H04R 1/345; H04R 2499/15; H04R 2201/025
See application file for complete search history.

(56) References Cited

FOREIGN PATENT DOCUMENTS

CN    111405398 B    * 12/2021    .............. G06F 3/011

* cited by examiner

*Primary Examiner* — Kile O Blair

(57) ABSTRACT

The present invention provides an audio output device. The audio output device includes a speaker unit, a first plate and a second plate. The speaker unit has a sound-emitting surface, and the sound-emitting surface has a first side and a second side opposite to each other. A first side edge of the first plate corresponds to the first side and is rotatably connected. A second side of the second plate corresponds to the second side and is rotatably connected, and a sound channel corresponding to the speaker unit is formed between the first plate and the second plate, and a sound outlet is formed at an end of the sound channel farthest away from the speaker unit, and a direction pointed by a connection line between a center point of the sound-emitting surface and a center point of the sound outlet is adjustable.

20 Claims, 10 Drawing Sheets

AUDIO OUTPUT DEVICE AND ELECTRONIC DEVICE COMPRISING THE SAME

This application claims the benefit of People's Republic of China application Serial No. 202011167382.9, filed Oct. 27, 2020, the subject matter of which is incorporated herein by reference.

BACKGROUND OF THE INVENTION

Field of the Invention

The present invention relates to an audio output device, and more particularly to an audio output device including a speaker unit.

Description of the Related Art

With the advancement of technology, consumers have higher and higher requirements for audio output devices, hoping to have a better listening experience. However, due to the individual differences of different viewers (such as differences in height or perception of sound) and the position of the audio output device fixed on the electronic device, it may be necessary to move the entire electronic device to allow the viewer to have a better listening experience. Therefore, there is still a need to develop an improved audio output device that allows viewers to obtain a better listening experience in a more convenient way.

SUMMARY OF THE INVENTION

The present invention provides an audio output device, which can adjust the sound transmission path, so that the viewer can obtain a better listening experience in a more convenient way without moving the entire electronic device.

To achieve the above purpose, the present invention provides an audio output device. The audio output device includes a speaker unit, a first plate and a second plate. The speaker unit has a sound-emitting surface, and the sound-emitting surface has a first side and a second side opposite to each other. A first side edge of the first plate corresponds to the first side and is rotatably connected. A second side of the second plate corresponds to the second side and is rotatably connected, and a sound channel corresponding to the speaker unit is formed between the first plate and the second plate, and a sound outlet is formed at an end of the sound channel farthest away from the speaker unit, and a direction pointed by a connection line between a center point of the sound-emitting surface and a center point of the sound outlet is adjustable.

To achieve the above purpose, the present invention also provides an electronic device. The electronic device includes a case and an audio output device. The audio output device is connected to the case. The audio output device includes a speaker unit, a first plate and a second plate. The speaker unit has a sound-emitting surface, and the sound-emitting surface has a first side and a second side opposite to each other. A first side edge of the first plate corresponds to the first side and is rotatably connected. A second side of the second plate corresponds to the second side and is rotatably connected, and a sound channel corresponding to the speaker unit is formed between the first plate and the second plate, and a sound outlet is formed at an end of the sound channel farthest away from the speaker unit, and a direction of a connection line between a center point of the sound outlet surface and a center point of the sound outlet is adjustable.

Compared with the prior art, in the audio output device of the present invention, the direction of the connection line between the center point of the sound output surface and the center point of the sound outlet is adjustable, so that the viewer can adjust the direction according to their own listening experience. If the position of the display is restricted, there is no need to move the display or the speaker unit, just adjust the first plate or/and the second plate to increase the sense of listening. Therefore, the audio output device of the present invention can provide viewers with a better listening experience in a more convenient way.

DETAILED DESCRIPTION OF THE INVENTION

In order to have a further understanding of the purpose, structure, features, and functions of the present invention, the following detailed descriptions are provided in conjunction with the embodiments.

Figure 1:
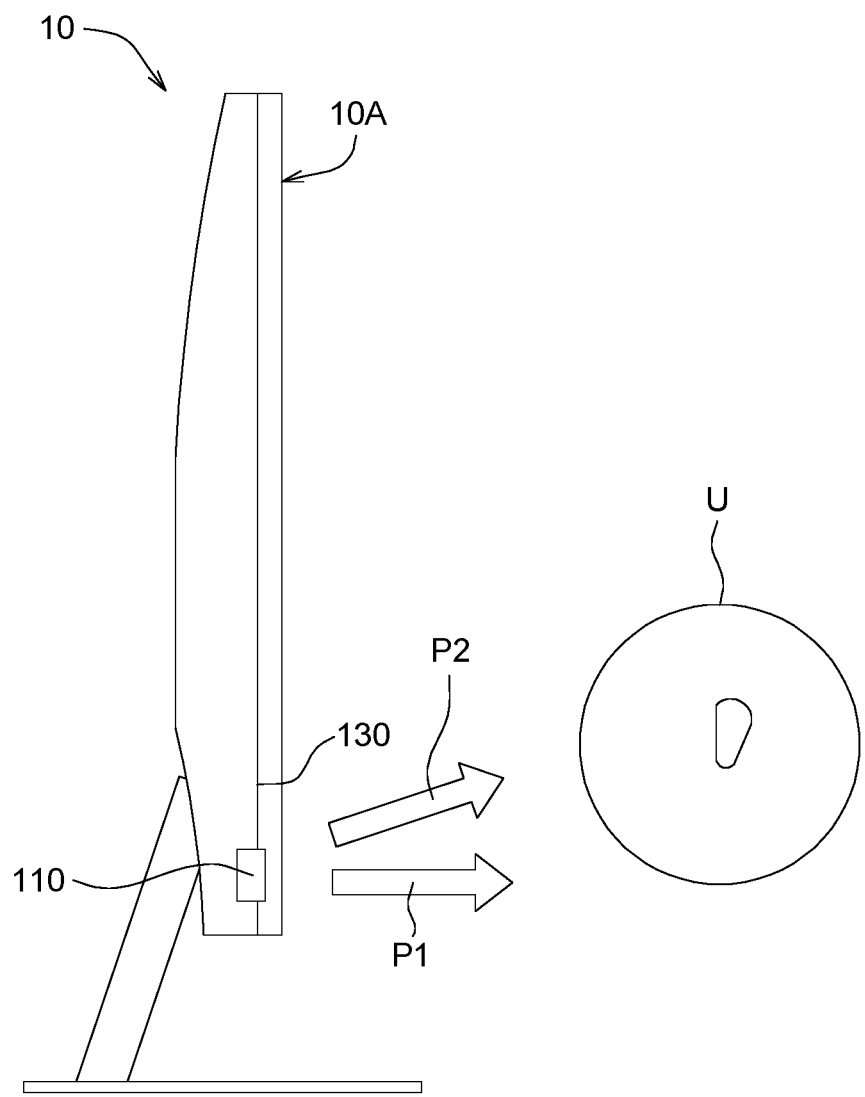
FIG. 1 is a schematic diagram of an electronic device according to an embodiment of the present invention.

FIG. 1 is a schematic diagram of an electronic device 10 according to an embodiment of the present invention.

The electronic device 10 includes a case 130 and an audio output device 110. The audio output device 110 is connected to the case 130. The case 130 may cover a part of the audio output device 110, for example, expose a sound outlet (shown in FIG. 2A). In the present embodiment, the electronic device 10 is a computer screen, but the present invention is not limited thereto. A front side 10A of the electronic device 10 faces a viewer U. The audio output device 110 is, for example, disposed on a lower edge of the electronic device 10 and transmits audio signals to the viewer U. The audio output device 110 is, for example, a front audio output design. However, the present invention is not limited thereto. The audio output device 110 may also be a side audio output design, a bottom audio output design or other suitable design. In some embodiments, due to adjustments of a tripod of the electronic device 10, the position where the viewer U is accustomed to listening is changed. In some embodiments, since heights of each viewer U are different, and the positions of the ears are also different, the produced sense of listening will also be different. In the audio output device 110 of the present invention, the viewer U can adjust the sound transmission path according to his/her own needs or feelings. For example, the sound can be transmitted to the viewer U along a transmission path P1 (for example, in the horizontal direction), or a sound transmission path may be raised, for example, the sound is transmitted to the viewer U along a transmission path P2.

Figure 2A:
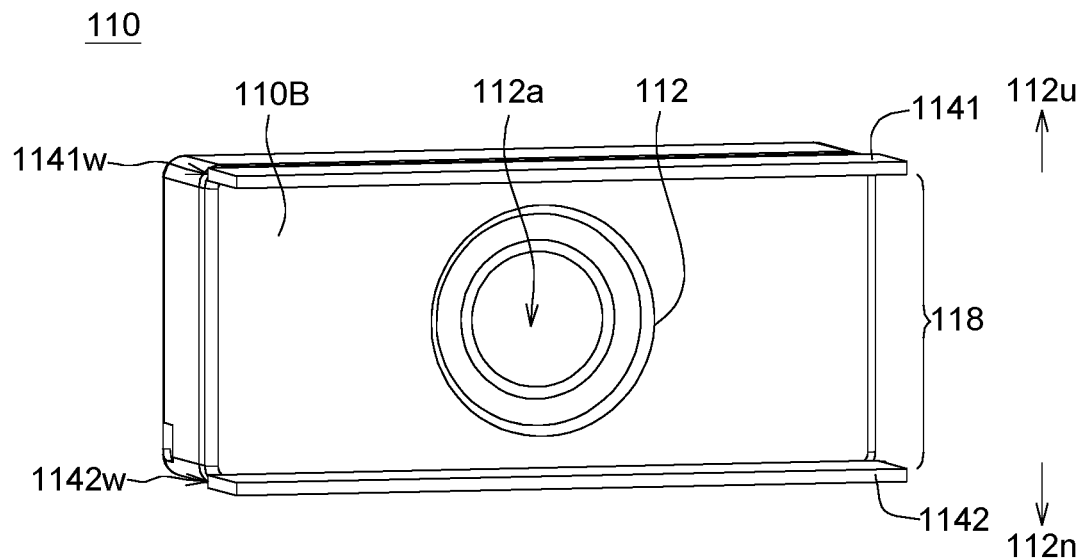
FIG. 2A is a perspective view of an audio output device according to an embodiment of the present invention.

FIG. 2A shows a perspective view of the audio output device 110 according to an embodiment of the present invention. FIGS. 2B to 2F are side views showing different implementations of the audio device 110.

Figure 2B:
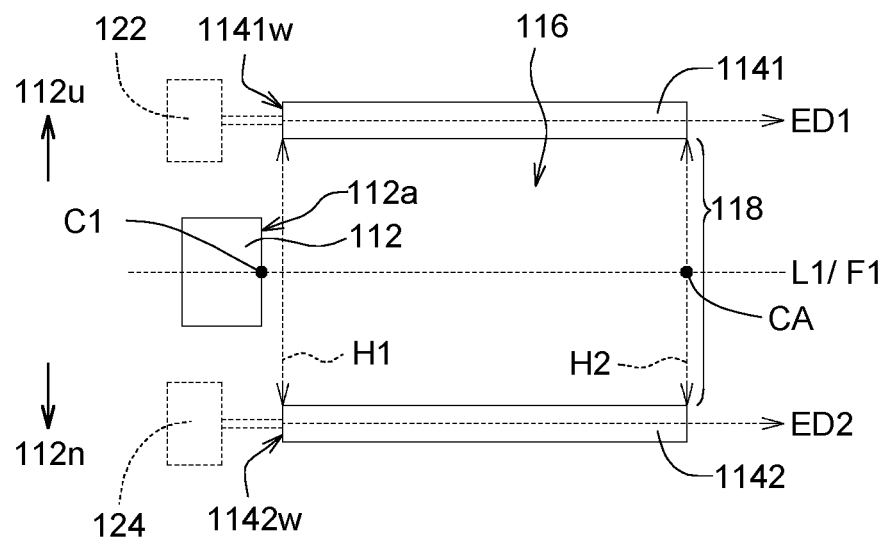
FIGS. 2B to 2F illustrate side views of different implementations of the audio output device.
Figure 2C:
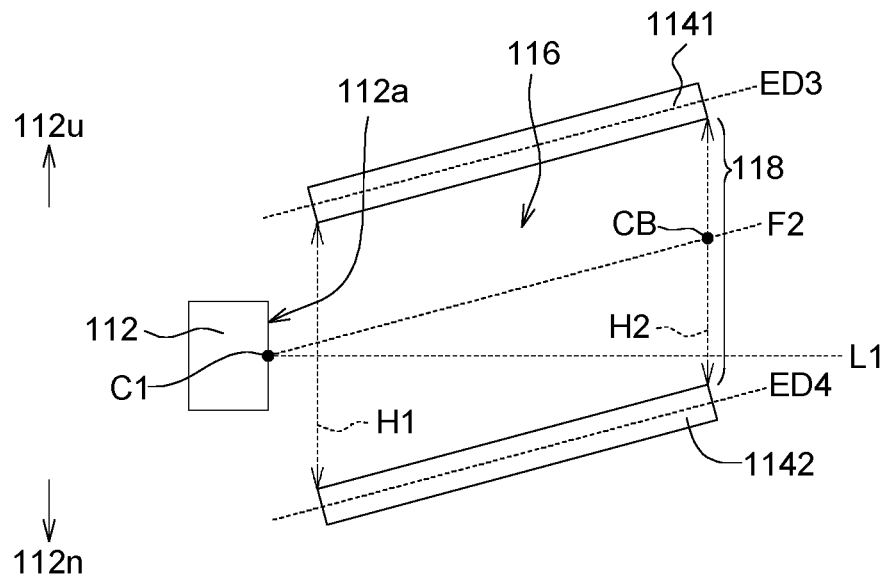
Figure 2D:
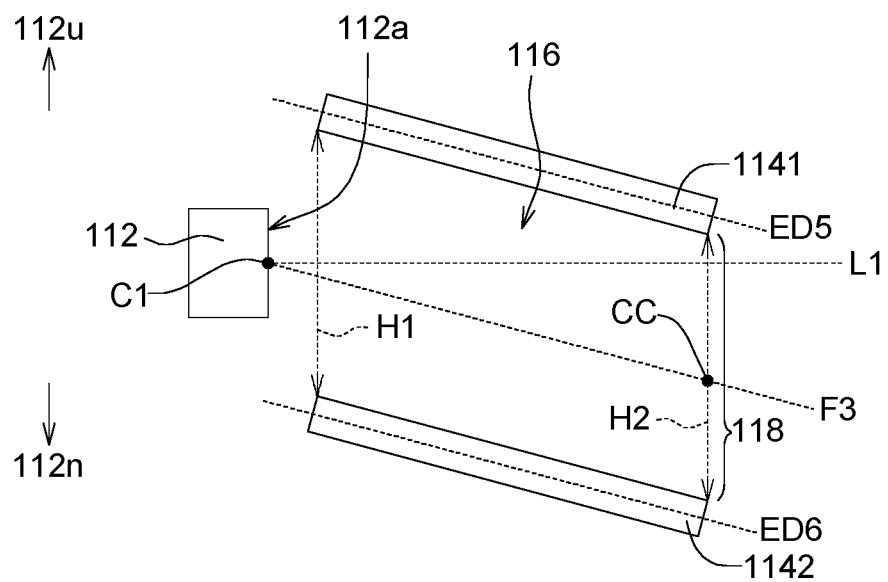
Figure 2E:
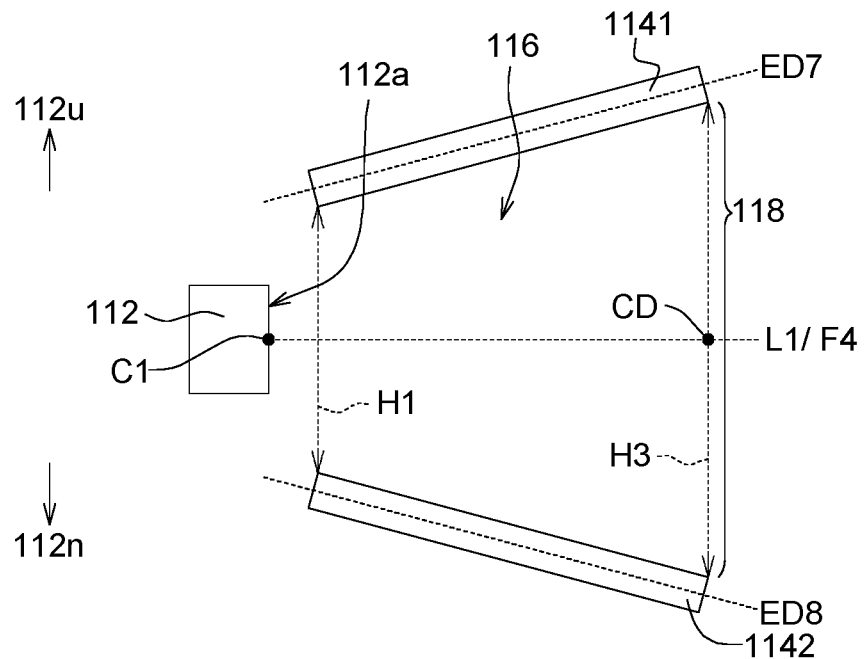
Figure 2F:
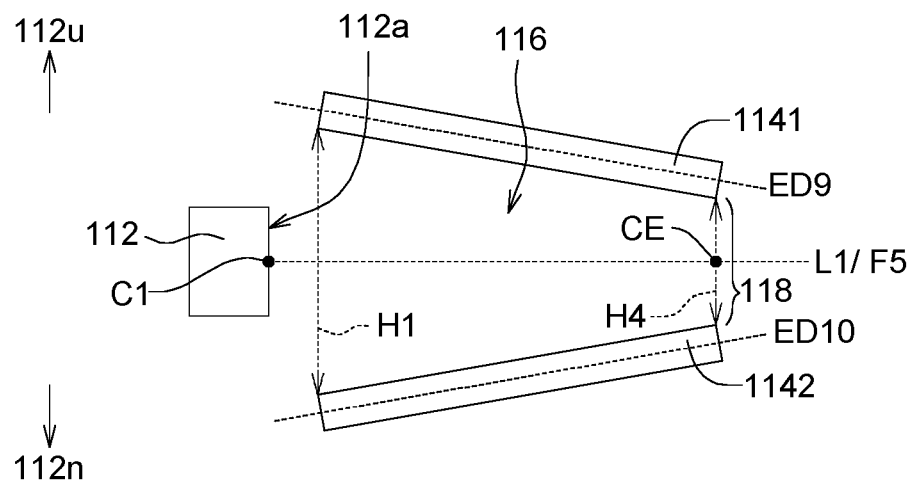

Referring to FIGS. 2A and 2B at the same time, the audio output device 110 includes a speaker unit 112, a first plate 1141, and a second plate 1142. The speaker unit 112 has a sound-emitting surface 112a, and the sound-emitting surface 112a has a first side 112u and a second side 112n opposite to each other. A first side edge 1141w of the first plate 1141 corresponds to the first side 112u and is rotatably connected, and a second side edge 1142w of the second plate 1142 corresponds to the second side 112n and is rotatably connected. In the present embodiment, the audio output device 110 further includes a base 110B, the speaker unit 112 is embedded in the base 110B, and the first side edge 1141w of the first plate 1141 is rotatably connected to the base 110B corresponding to the first side 112u. The second side edge 1142w of the second plate 1142 is rotatably connected to the base 110B corresponding to the second side 112n, but the present invention is not limited thereto. In other embodiments, the audio output device may not include a base. A sound channel 116 corresponding to the speaker unit 112 is formed between the first plate 1141 and the second plate 1142, and a sound outlet 118 is formed at an end of the sound channel 116 farthest away from the speaker unit 112. The sound-emitting surface 112a represents a surface on which the sound is transmitted by the speaker unit 112. After the sound is transmitted from the speaker unit 112 through the sound-emitting surface 112a, the sound is transmitted to the viewer U through the sound channel 116 and the sound outlet 118 in sequence. Wherein, a direction of a connection line F1 between a center point C1 of the sound-emitting surface 112a and a center point CA of the sound outlet 118 is adjustable. For example, the direction of the connection line F1 between the center point C1 of the sound-emitting surface 112a and the center point CA of the sound outlet 118 can be adjusted by rotating the first plate 1141 or/and the second plate 1142, that is, the sound transmission path can be adjusted.

In an embodiment, the audio output device 110 further includes a plurality of direction control mechanisms 122 and 124, and the direction control mechanisms 122 and 124 are respectively connected to the first plate 1141 and the second plate 1142. The direction control mechanisms 122 and 124 can respectively control the rotation direction of the first plate 1141 and the second plate 1142. In some embodiments, the audio output device 110 only includes one direction control mechanism, that is, only the first plate 1141 or the second plate 1142 is connected to the direction control mechanism 122 or 124. In some embodiments, the rotation directions of the first plate 1141 and the second plate 1142 can be manually or electrically controlled. In some embodiments, the direction control mechanisms 122 and 124 can be implemented by knobs, levers, buttons, or other suitable mechanisms, respectively, and the direction control mechanisms 122 and 124 can be used to control the upward or downward direction, and can also be used to control the direction toward left or right, as long as the viewer U can adjust the first plate 1141 or/and the second plate 1142 to a position where the sound can be transmitted to the most comfortable listening position.

According to an embodiment, the first plate 1141 extends in a direction farther away from the speaker unit 112 along the first extension direction ED1, and the second plate 1142 extends in a direction farther away from the speaker unit 112 along the second extension direction ED2. In the present embodiment, an extension line L1 of the center point C1 of the sound-emitting surface 112a extending along a normal direction of the sound-emitting surface 112a passes through the sound outlet 118 (as shown in FIGS. 2B to 2F), but the present invention is not limited thereto.

In the embodiment shown in FIG. 2B, the first extension direction ED1 is the same as the second extension direction ED2, and the sound channel 116 between the first plate 1141 and the second plate 1142 has a first height H1 on a side adjacent to the speaker unit 112, and the sound channel 116 between the first plate 1141 and the second plate 1142 has a second height H2 on a side farther away from the speaker unit 112, wherein the first height H1 is equal to the second height H2. In addition, the first extension direction ED1 and the second extension direction ED2 are parallel to a normal direction of the sound-emitting surface 112a, so that a direction pointed by a connection line F1 between the center point C1 and the center point CA is also parallel to the normal line of the sound-emitting surface 112a.

If the viewer U wants the sound to be transmitted toward the first side 112u (for example, above) of the speaker unit 112, the first plate 1141 and/or the second plate 1142 can be rotated so that a direction pointed by a connection line F2 of a center point C1 and a center point CB may be biased toward the first side 112u. In the embodiment shown in FIG. 2C, the first extension direction ED3 is the same as the second extension direction ED4, and the sound channel 116 between the first plate 1141 and the second plate 1142 has a first height H1 on a side adjacent to the speaker unit 112, and the sound channel 116 between the first plate 1141 and the second plate 1142 has a second height H2 on a side farther away from the speaker unit 112, wherein the first height H1 is equal to the second height H2. In addition, the first extension direction ED1 and the second extension direction ED2 is intersected with an extension line L1 in the normal direction of the sound-emitting surface 112a. In the present embodiment, the first extension direction ED3 is parallel to the second extension direction ED4, but the present invention is not limited thereto. In other embodiments, the first extension direction ED3 and the second extension direction ED4 may be intersected with each other. For example, there is a first angle between the first extension direction ED3 and the extension line L1 in the normal direction of the sound-emitting surface 112a, and there is a second angle between the second extension direction ED4 and the extension line L1 in the normal direction of the sound-emitting surface 112a, and the first angle is different from the second angle. Further, the first height H1 may be different from the second height H2.

If the viewer U wants the sound to be transmitted toward the second side 112n (for example, below) of the speaker unit 112, the first plate 1141 and/or the second plate 1142 can be rotated, so that a direction pointed by a connection line F3 of the center point C1 and a center point CC may be biased toward the second side 112n. In the embodiment shown in FIG. 2D, the first extension direction ED5 is the same as the second extension direction ED6, and the sound channel 116 between the first plate 1141 and the second plate 1142 has a first height H1 on a side adjacent to the speaker unit 112, and the sound channel 116 between the first plate 1141 and the second plate 1142 has a second height H2 on a side farther away from the speaker unit 112, wherein the first height H1 is equal to the second height H2. In addition, the first extension direction ED5 and the second extension direction ED6 are intersected with the extension line L1 in the normal direction of the sound-emitting surface 112a. In the present embodiment, the first extension direction ED5 is parallel to the second extension direction ED6. However, the present invention is not limited thereto. In other embodiments, the first extension direction ED5 and the second extension direction ED6 may be intersected with each other. For example, there is a first angle between the first extension direction ED5 and the extension line L1 in the normal direction of the sound-emitting surface 112a, and there is a second angle between the second extension direction ED6 and the extension line L1 in the normal direction of the sound-emitting surface 112a. The first angle is different from the second angle. Further, the first height H1 may be different from the second height H2.

If the viewer U wants a wider range of sound transmission, the first plate 1141 and/or the second plate 1142 can be rotated to enlarge the sound outlet 118. In the embodiment shown in FIG. 2E, a first extension direction ED7 is different from a second extension direction ED8, and the sound channel 116 between the first plate 1141 and the second plate 1142 has a first height H1 on a side adjacent to the speaker unit 112, and the sound channel 116 between the first plate 1141 and the second plate 1142 has a second height H3 on a side farther away from the speaker unit 112, wherein the first height H1 is different from the second height H3. For example, the first height H1 is smaller than the second height H3. In addition, the first extension direction ED7 and the second extension direction ED8 are intersected with the extension line L1 in the normal direction of the sound-emitting surface 112a. In the present embodiment, the extension line L1 in the normal direction of the sound-emitting surface 112a is the same as a connection line F4 between the center point C1 and the center point CD, but the present invention is not limited thereto.

If the viewer U wants a more concentrated range of sound transmission, the first plate 1141 and/or the second plate 1142 can be rotated to reduce the sound outlet 118. In the embodiment shown in FIG. 2F, the first extension direction ED9 is different from the second extension direction ED10, and the sound channel 116 between the first plate 1141 and the second plate 1142 has a first height H1 on the side adjacent to the speaker unit 112, and the sound channel 116 between the first plate 1141 and the second plate 1142 has a second height H4 on a side farther away from the speaker unit 112, wherein the first height H1 is different from the second height H4. For example, the first height H1 is greater than the second height H4. In addition, the first extension direction ED9 and the second extension direction ED10 are intersected with the extension line L1 in the normal direction of the sound-emitting surface 112a. In the present embodiment, the extension line L1 in the normal direction of the sound-emitting surface 112a is the same as a connection line F5 between the center point C1 and a center point CE, but the present invention is not limited thereto.

Figure 3:
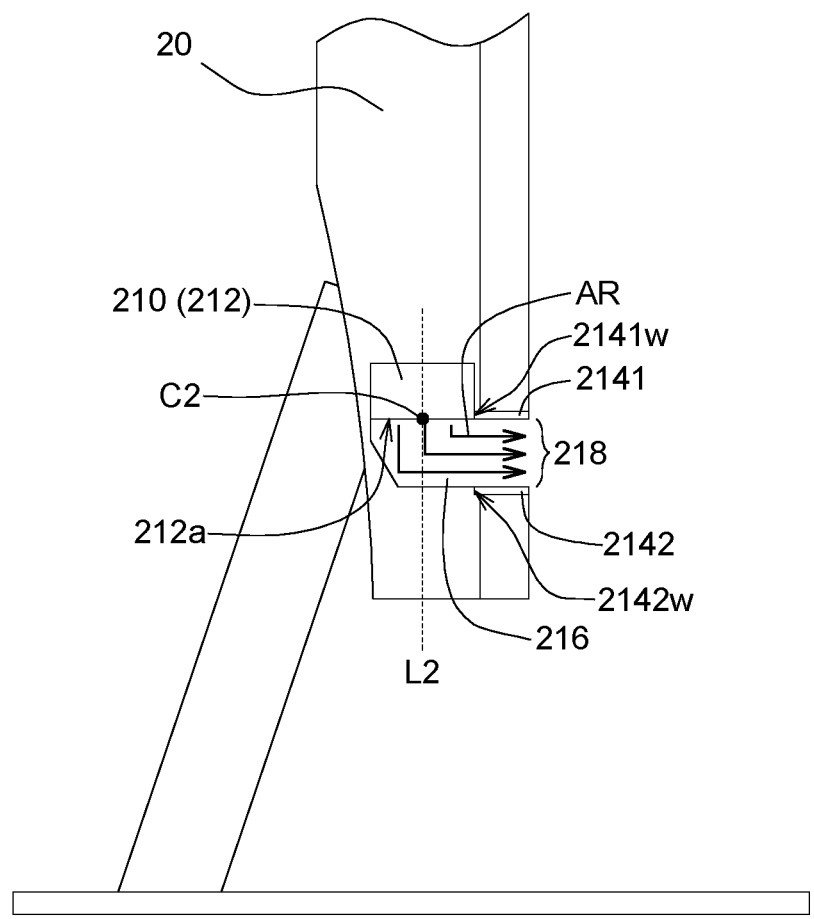
FIG. 3 is a schematic diagram of an electronic device according to a further embodiment of the present invention.

FIG. 3 is a schematic diagram of an electronic device 20 according to a further embodiment of the present invention. The difference between the electronic device 20 and the electronic device 10 lies in the design of an audio output device 210, and other identical or similar portions will not be described in detail.

Referring to FIG. 3, the audio output device 210 includes a speaker unit 212, a first plate 2141 and a second plate 2142. The speaker unit 212 has a sound-emitting surface 212a, and the sound-emitting surface 212a has a first side 212u and a second side 212n opposite to each other. A first side edge 2141w of the first plate 2141 corresponds to the first side 212u and is rotatably connected. A second side edge 2142w of the second plate 2142 corresponds to the second side 212n and is rotatably connected. The first plate 2141 and the second plate 2142 may be connected to a case of the electronic device 20 respectively. A sound channel 216 corresponding to the speaker unit 212 is formed between the first plate 2141 and the second plate 2142, and a sound outlet 218 is formed at an end of the sound channel 216 farthest away from the speaker unit 212. In the present embodiment, an extension line L2 extending from a center point C2 of a sound-emitting surface 212a along a normal direction of the sound-emitting surface 212a is separated from the sound outlet 218. The sound-emitting surface 212a is disposed downward, for example, so that the sound passes through the sound channel 216 in a direction of the arrow AR after being transmitted from the sound-emitting surface 212a, and is transmitted to the viewer through the sound outlet 218. The adjustment methods of the first plate 2141 and the second plate 2142 are similar to that of the first plate 1141 and the second plate 1142, respectively. In another embodiment, the first side edge 2141w of the first plate 2141 and/or the second side edge 2142w of the second plate 2142 can also bend and extend from the sound-emitting surface 212a to the sound outlet 218.

Figure 4A:
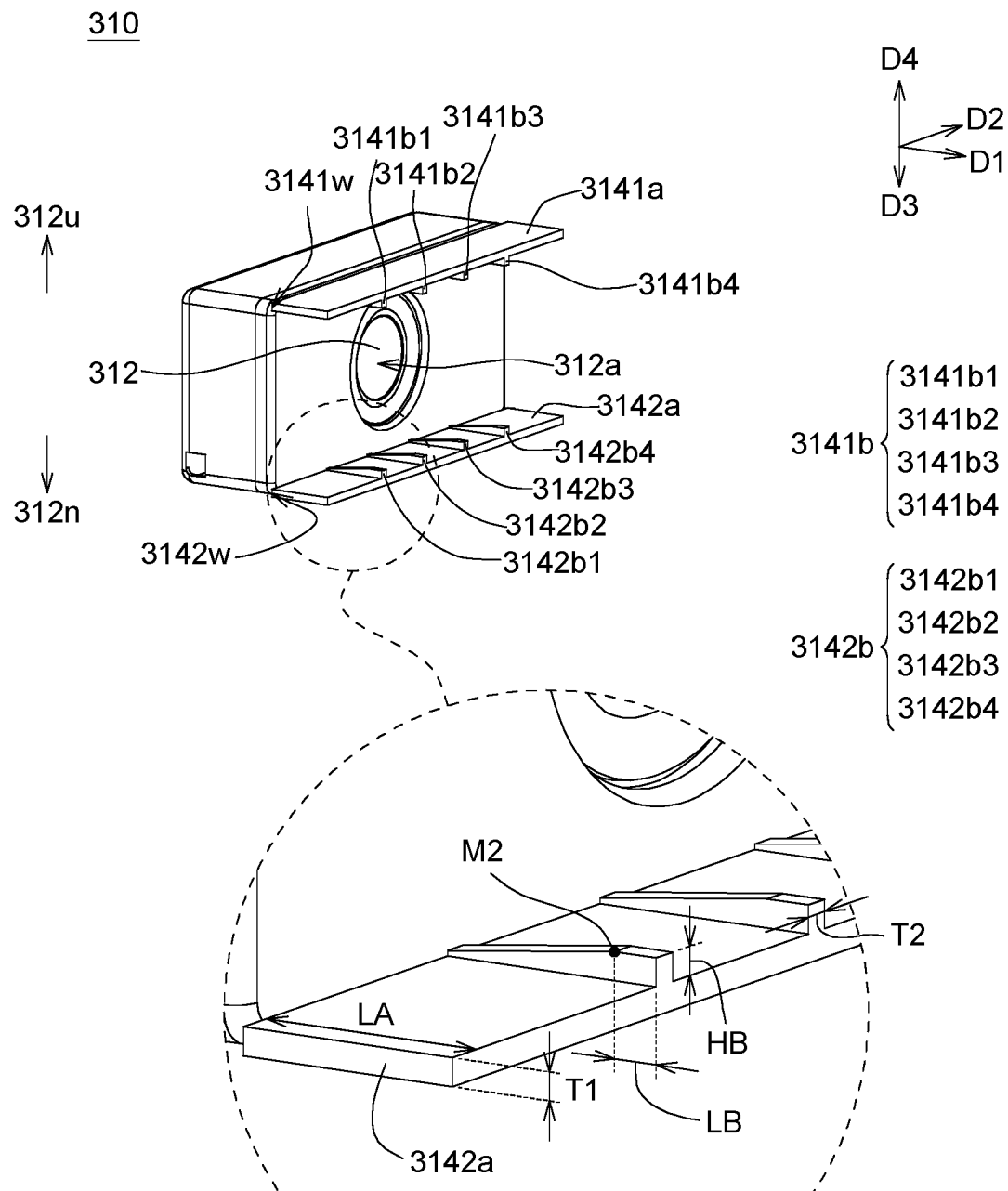
FIG. 4A is a perspective view of an audio output device according to a further embodiment of the present invention.
Figure 4B:
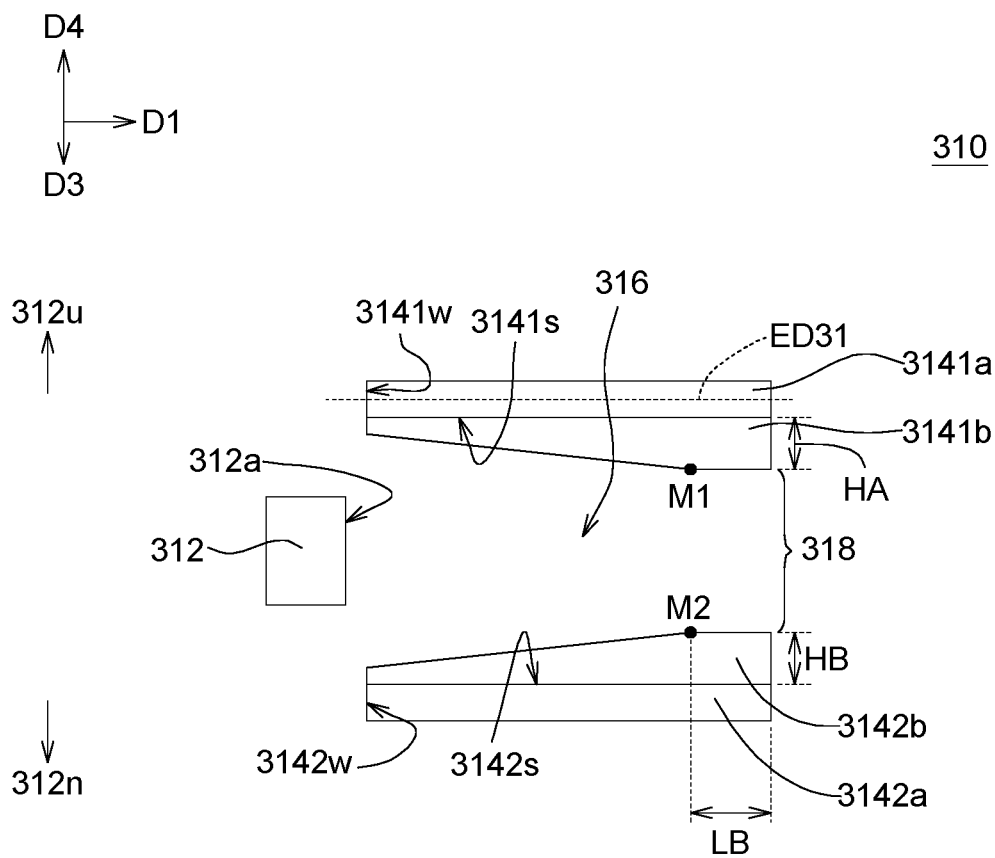
FIG. 4B is a side view of an audio output device according to a further embodiment of the present invention.

FIG. 4A is a perspective view of an audio output device 310 according to a further embodiment of the present invention. FIG. 4B shows a side view of the audio output device 310 according to a further embodiment of the present invention. The difference between the audio output device 310 and the audio output device 210 is that an upper sound guiding structure 3141b and a lower sound guiding structure 3142b are respectively disposed on the first plate 3141a and the second plate 3142a.

Referring to FIGS. 4A and 4B at the same time, the audio output device 310 includes a speaker unit 312, a first plate 3141a, a second plate 3142a, an upper sound guiding structure 3141b, and a lower sound guiding structure 3142b. The speaker unit 312 has a sound-emitting surface 312a, and the sound-emitting surface 312a has a first side 312u and a second side 312n opposite to each other. A first side edge 3141w of the first plate 3141a corresponds to the first side 312u and is rotatably connected. The second side edge 3142w of the second plate 3142a corresponds to the second side 312n and is rotatably connected, and a sound channel 316 corresponding to the speaker unit 312 is formed between the first plate 3141a and the second plate 3142a, and a sound outlet 318 is formed at an end of the sound channel 316 farthest away from the speaker unit 312. The adjustment methods of the first plate 3141a and the second plate 3142a are similar to that of the first plate 1141 and the second plate 1142, respectively. The first plate 3141a has a lower surface 3141s corresponding to the sound channel 316, and the second plate 3142a has an upper surface 3142s corresponding to the sound channel 316. The upper sound guiding structure 3141b is disposed on the lower surface 3141s and protrudes toward the sound channel 316. The lower sound guiding structure 3142b is disposed on the upper surface 3142s and protrudes toward the sound channel 316. In some embodiments, the first plate 3141a and the upper sound guiding structure 3141b are an integrally formed structure, and the second plate 3142a and the lower sound guiding structure 3142b are an integrally formed structure.

The upper sound guiding structure 3141b includes a plurality of rib structures 3141b1, 3141b2, 3141b3, 3141b4, and the lower sound guiding structure 3142b includes a plurality of rib structures 3142b1, 3142b2, 3142b3, 3142b4. The present embodiment only illustrates four rib structures of the upper sound guiding structure 3141b and four rib structures of the lower sound guiding structure 3142b. However, the number of rib structures is not limited thereto, and can be adjusted according to requirements. The rib structures 3141b1, 3141b2, 3141b3, and 3141b4 of the upper sound guiding structure 3141b respectively extend along a first direction D1 on the lower surface 3141s, are separated from each other along a second direction D2, and protrude toward the sound channel 316 along a third direction D3, wherein the first plate 3141a has a first extension direction ED31 extending farther away from the speaker unit 312, the first direction D1 is parallel to the first extension direction ED31, and the first direction D1, the second direction D2, and the third direction D3 are intersected with each other. The rib structures 3142b1, 3142b2, 3142b3, and 3142b4 are disposed on the upper surface 3142s of the lower sound guiding structure 3142b extending along the first direction D1, are separated from each other along the second direction D2, and protrude toward the sound channel 316 along the fourth direction D4, wherein the fourth direction D4 is opposite to the third direction D3.

Each of the rib structures 3141b1, 3141b2, 3141b3, 3141b4 of the upper sound guiding structure 3141b has a first protrusion height in the third direction D3, and the first protrusion height increases along the first direction D1 to the highest point M1 and then forms a first protrusion height HA. Each of the rib structures 3142b1, 3142b2, 3142b3, 3142b4 of the lower sound guiding structure 3142b has a second protrusion height in the fourth direction D4, and the second protrusion height increases along the first direction D1 to the highest point M2 and then forms a second protrusion height HB. In the present embodiment, the size of each of the rib structures 3141b1, 3141b2, 3141b3, 3141b4 of the upper sound guiding structure 3141b is the same as the size of each of the rib structures 3142b1, 3142b2, 3142b3, 3142b4 of the lower sound guiding structure 3142b, that is, having the same length, width and height, but the present invention is not limited thereto. For the convenience of description, FIG. 4A of the present application only takes the lower sound guiding structure 3142b and the rib structures 3142b1, 3142b2 as an example to illustrate the size design of the rib structures.

Referring to FIG. 4A, the second plate 3142a has a length LA in the first direction D1 and a thickness T1 in the fourth direction D4. The length of the rib structures 3142b1, 3142b2 extending in the first direction D1 may be the same as or less than the length LA. A thickness T2 in the second direction D2 may be greater than the thickness T1 (i.e. T2>T1), and a second protrusion height HB corresponding to a highest point M2 may be greater than the thickness T1 (i.e. HB>T1), and a length LB of a connection line between the highest point M2 and the sound outlet 318 projected perpendicularly on the second plate 3142a is smaller than half of the length LA (i.e. LB<½*LA).

Compared with the comparative example that does not have the upper sound guiding structure or the lower sound guiding structure, since the audio output device 310 of the present embodiment includes the upper sound guiding structure 3141b and the lower sound guiding structure 3142b, an effect of sound concentration may be achieved through the highest points M1 and M2 of the rib structures 3141b1, 3141b2, 3141b3, 3141b4, 3142b1, 3142b2, 3142b3, 3142b4.

In the embodiment of FIGS. 4A and 4B, the first protrusion height HA of the rib structures 3141b1, 3141b2, 3141b3, and 3141b4 formed between the highest point M1 and the sound outlet 318 remains unchanged, and the second protrusion height HB of the rib structures 3142b1, 3142b2, 3142b3, 3142b4 formed between the highest point M2 and the sound outlet 318 remains unchanged, but the present invention is not limited thereto, and the rib structures can have other designs (as shown in the embodiment of FIGS. 5A to 5D).

FIGS. 5A to 5D are schematic diagrams of rib structures according to a further embodiment of the present invention. For the convenience of description, FIGS. 5A to 5D only describe the lower sound guiding structures 4142b, 5142b, 6142b, and 7142b. The upper sound guiding structures may also have similar sizes and configurations, and the description will not be repeated here.

Figure 5A:
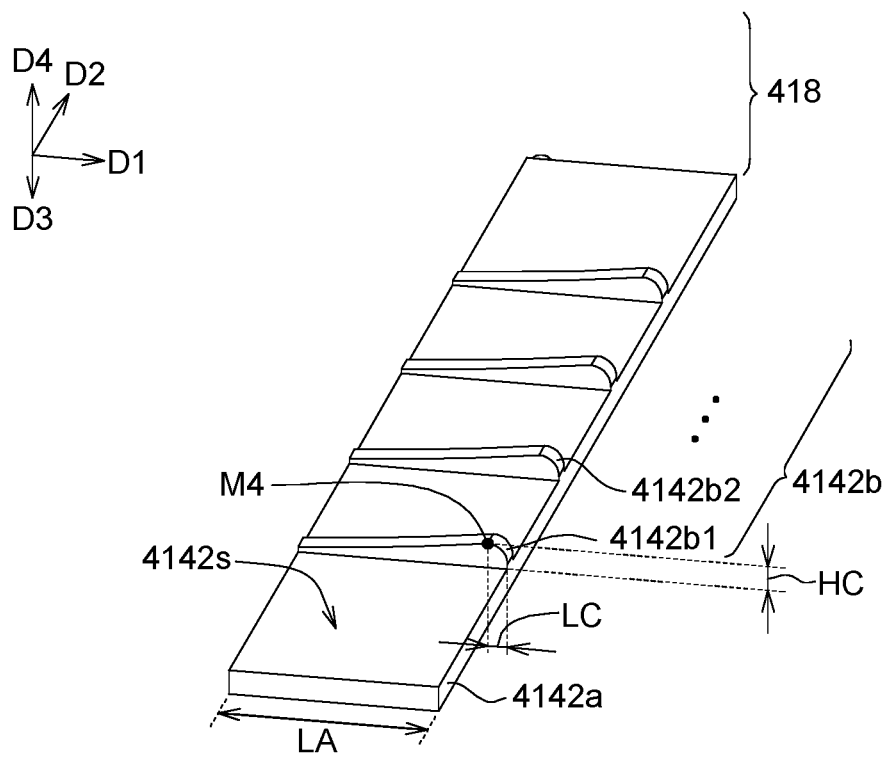
FIG. 5A to FIG. 5D are schematic diagrams of rib structures according to a further embodiment of the present invention.

Referring to FIG. 5A, the lower sound guiding structure 4142b is disposed on the upper surface 4142s of the second plate 4142a, the lower sound guiding structure 4142b includes a plurality of rib structures 4142b1, 4142b2 . . . , the rib structures 4142b1, 4142b2 . . . are respectively protrude toward the sound channel along the fourth direction D4 and are separated from each other along the second direction D2. Each of the rib structures 4142b1, 4142b2 of the lower sound guiding structure 4142b has a second protrusion height HC in the fourth direction D4, and the second protrusion height HC increases along the first direction D1 to the highest point M4, and then decreases toward a sound outlet 418. A distance LC between a highest point M4 and the sound outlet 418 in FIG. 5A is smaller than a distance LB between the highest point M2 and the sound outlet 318 in FIG. 4B. For example, the distance LC is smaller than ⅕ of the length LA (i.e. LC<⅕*LA).

Figure 5B:
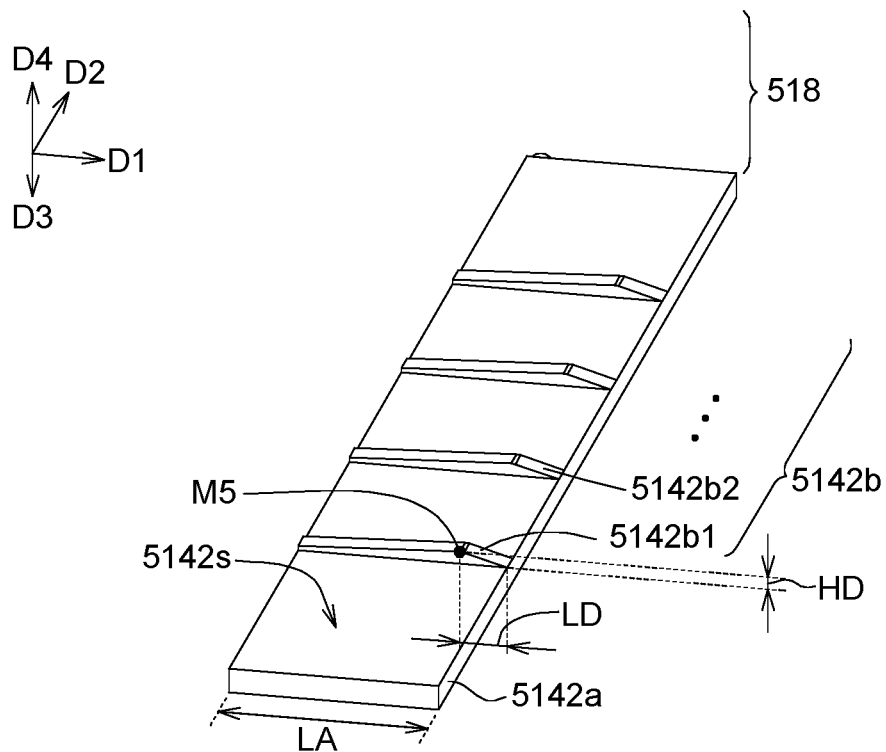

Referring to FIG. 5B, the lower sound guiding structure 5142b is disposed on the upper surface 5142s of the second plate 5142a, the lower sound guiding structure 5142b includes a plurality of rib structures 5142b1, 5142b2 . . . , the rib structures 5142b1, 5142b2 . . . respectively protrude toward the sound channel along the fourth direction D4, and are separated from each other along the second direction D2. Each of the rib structures 5142b1, 5142b2 of the lower sound guiding structure 5142b has a second protrusion height HD in the fourth direction D4, and the second protrusion height HD increases along the first direction D1 to the highest point M5, and then decrease toward the sound outlet 518. A distance LD between the highest point M5 and the sound outlet 518 in FIG. 5B is greater than the distance LC between the highest point M4 and the sound outlet 418 in FIG. 5A. For example, the distance LD is greater than ⅕ of the length LA and smaller than ½ of the length LA (i.e. ⅕*LA<LD<½*LA). The rib structures 5142b1, 5142b2 . . . form obtuse angles at the positions corresponding to the highest points M5.

Figure 5C:
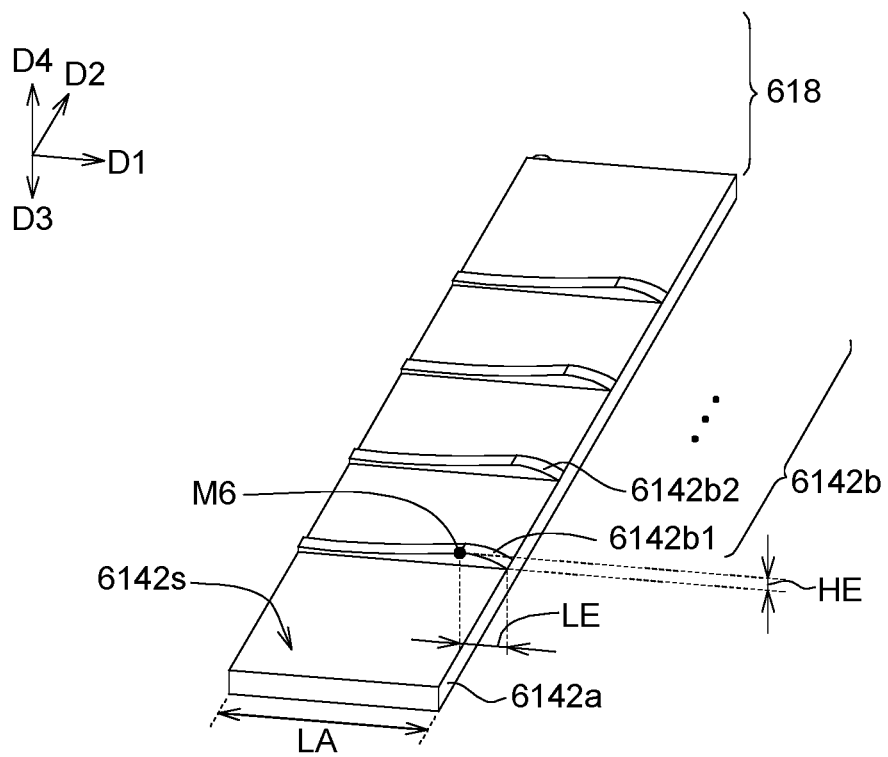

Referring to FIG. 5C, the lower sound guiding structure 6142b is disposed on the upper surface 6142s of the second plate 6142a, the lower sound guiding structure 6142b includes a plurality of rib structures 6142b1, 6142b2 . . . , the rib structures 6142b1, 6142b2 . . . are respectively protrude toward the sound channel along the fourth direction D4 and are separated from each other along the second direction D2. Each of the rib structures 6142b1, 6142b2 of the lower sound guiding structure 6142b has a second protrusion height HE in the fourth direction D4, and the second protrusion height HE increases along the first direction D1 to the highest point M6, and then decreases toward the sound outlet 618. A distance LE between the highest point M6 and the sound outlet 618 in FIG. 5C is greater than the distance LC between the highest point M4 and the sound outlet 418 in FIG. 5A. For example, the distance LE is greater than ⅕ of the length LA and smaller than ½ of the length LA (i.e. ⅕*LA<LE<½*LA). The rib structures 6142b1, 6142b2 . . . have rounded angles at the positions corresponding to the highest points M6.

Figure 5D:
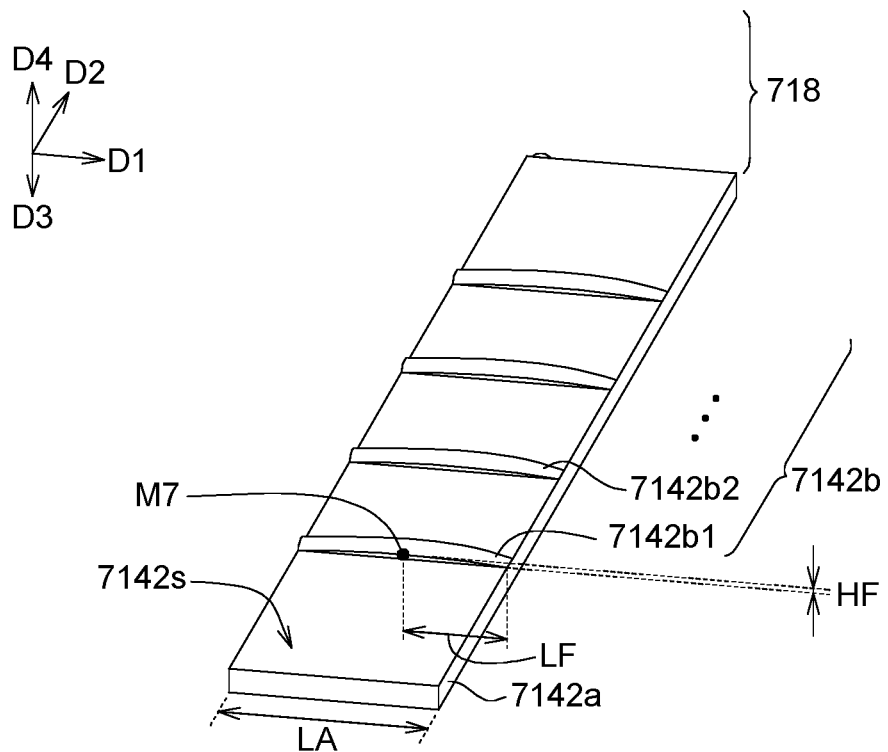

Referring to FIG. 5D, the lower sound guiding structure 7142b is disposed on the upper surface 7142s of the second plate 7142a, the lower sound guiding structure 7142b includes a plurality of rib structures 7142b1, 7142b2 . . . , the rib structures 7142b1, 7142b2 . . . are respectively protrude toward the sound channel along the fourth direction D4, and are separated from each other along the second direction D2. Each of the rib structures 7142b1, 7142b2 of the lower sound guiding structure 7142b has a second protrusion height HF in the fourth direction D4, and the second protrusion height HF increases along the first direction D1 to the highest point M7, and then decreases toward the sound outlet 718. A distance LF between the highest point M7 and the sound outlet 718 in FIG. 5D is greater than the distance LE between the highest point M6 and the sound outlet 618 in FIG. 5C. For example, the distance LF is greater than ⅓ of the length LA and less than ½ of the length LA (i.e. ⅓*LA<LF<½*LA). The rib structures 7142b1, 7142b2 . . . have rounded angles at the positions corresponding to the highest points M7.

The above-mentioned embodiments of the present application can be combined with each other, or can be combined with other embodiments.

Figure 6:
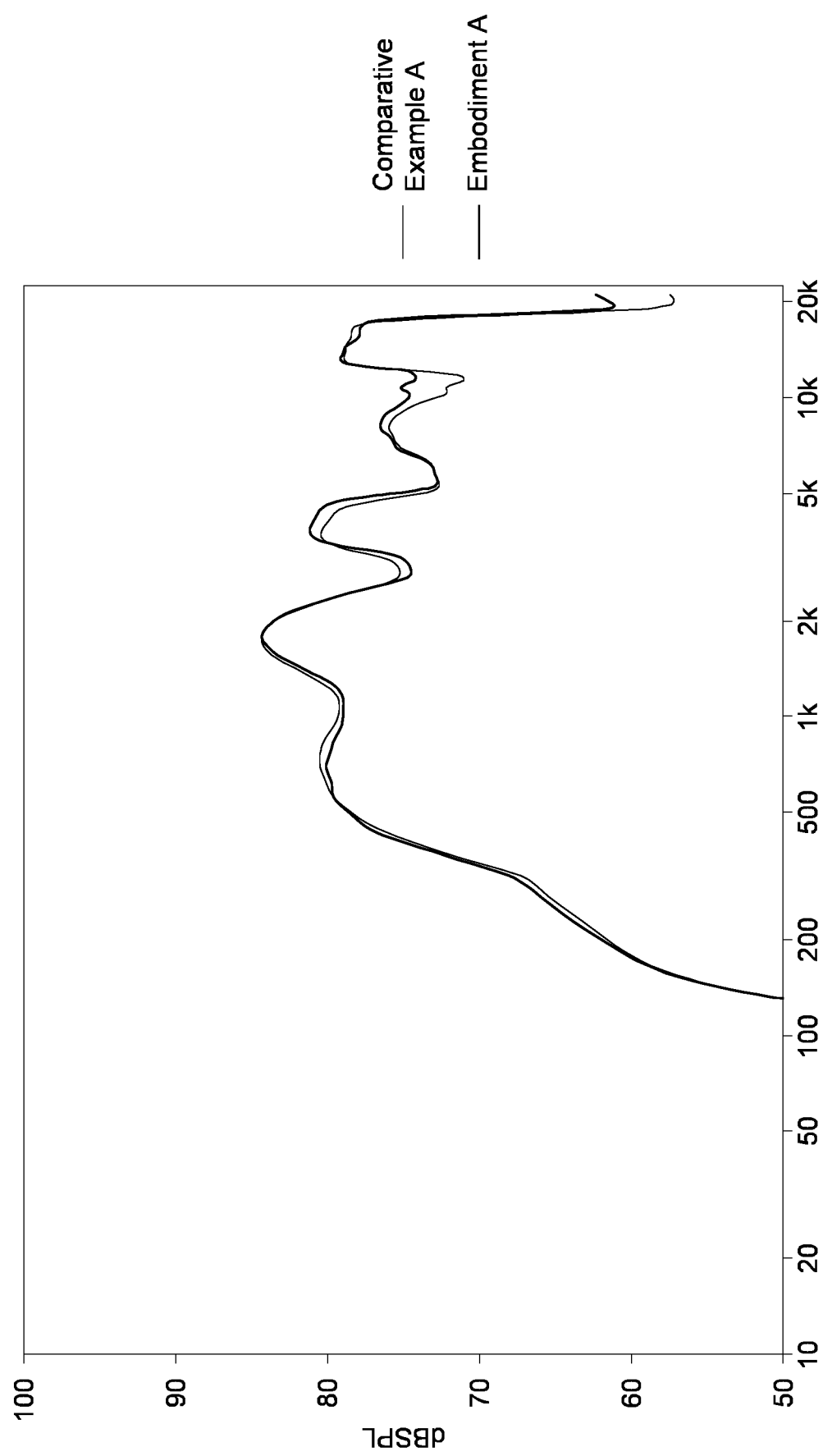
FIG. 6 is a diagram showing the relationship between the audio frequency and decibels of an audio output device of a Comparative Example and an audio output device of an Embodiment.

FIG. 6 is a diagram showing the relationship between the audio frequency and decibels of an audio output device of Comparative Example A and an audio output device of Embodiment A.

In the audio output device of Comparative Example A, the upper sound guiding structure or the lower sound guiding structure is not provided on the first plate or the second plate. In the audio output device of Embodiment A, the first plate or/and the second plate are provided with an upper sound guiding structure or/and a lower sound guiding structure (for example, a plurality of rib structures, as shown in the embodiments of FIGS. 4A to 5D).

Referring to FIG. 6, compared to Comparative Example A, since Embodiment A has an upper sound guiding structure or/and a lower sound guiding structure, the decibels of the sound are significantly increased in the audio frequency ranging above 3K, indicating that it can allow the viewer U to have a better listening experience.

According to an embodiment of the present invention, the audio output device includes a speaker unit, a first plate, and a second plate. The speaker unit has a sound-emitting surface, and the sound-emitting surface has a first side and a second side opposite to each other. A first side edge of the first plate corresponds to the first side and is rotatably connected. A second side edge of the second plate corresponds to the second side and is rotatably connected, and a sound channel corresponding to the speaker unit is formed between the first plate and the second plate, and a sound outlet is formed at an end of the sound channel farthest away from the speaker unit, a direction pointed by a connection line between a center point of the sound-emitting surface and a center point of the sound outlet is adjustable.

Since the direction pointed by the connection line between the center point of the sound-emitting surface and the center point of the sound outlet is adjustable in the audio output device of the present invention, the viewer can adjust the direction according to their own listening experience. If the position of the display is restricted, there is no need to move the display or the speaker unit, just adjust the first plate or/and the second plate to increase the sense of listening. Therefore, the audio output device of the present invention can provide viewers with a better listening experience in a more convenient way.

The present invention has been described by the above-mentioned related embodiments, but the above-mentioned embodiments are only examples for implementing the present invention. It must be pointed out that the disclosed embodiments do not limit the scope of the present invention. On the contrary, any changes and modifications made without departing from the spirit and scope of the present invention belong to the scope protected in the present invention.

What is claimed is:

1. An audio output device, comprising:
   a speaker unit, having a sound-emitting surface, and the sound-emitting surface has a first side and a second side opposite to each other;
   a first plate, a first side edge of the first plate corresponding to the first side and rotatably connected;
   a second plate, a second side edge of the second plate corresponding to the second side and rotatably connected, wherein a sound channel corresponding to the speaker unit is formed between the first plate and the second plate, and a sound outlet is formed at an end of the sound channel farthest away from the speaker unit, wherein a direction pointed by a connection line between a center point of the sound-emitting surface and a center point of the sound outlet is adjustable.

2. The audio output device according to claim 1, further comprising a direction control mechanism, wherein the direction control mechanism is connected to the first plate or the second plate.

3. The audio output device according to claim 1, further comprising at least two direction control mechanisms, wherein the at least two direction control mechanisms are respectively connected to the first plate and the second plate.

4. The audio output device according to claim 1, wherein the first plate extends along a first extension direction toward a direction farther away from the speaker unit, and the second plate extends along a second extension direction toward a direction farther away from the speaker unit.

5. The audio output device according to claim 4, wherein the first extension direction is the same as the second extension direction.

6. The audio output device according to claim 4, wherein the first extension direction is different from the second extension direction.

7. The audio output device according to claim 4, wherein the first plate has a lower surface corresponding to the sound channel, and the second plate has an upper surface corresponding to the sound channel,
   wherein the audio output device further comprises an upper sound guiding structure and a lower sound guiding structure, wherein the upper sound guiding structure is disposed on the lower surface and protrudes toward the sound channel; the lower sound guiding structure is disposed on the upper surface and protrudes toward the sound channel.

8. The audio output device according to claim 7, wherein the upper sound guiding structure comprises at least two rib structures, and the lower sound guiding structure comprises at least two rib structures,
   wherein the at least two rib structures of the upper sound guiding structure extend along a first direction on the lower surface, and are separated from each other along a second direction, and protrude toward the sound channel along a third direction, wherein the first plate has a first extension direction extending farther away from the speaker unit, the first direction is parallel to the first extension direction, and the first direction, the second direction and the third direction are intersected with each other; and wherein the at least two rib structures of the lower sound guiding structure extend along the first direction on the upper surface, and are separated from each other along the second direction, and protrude toward the sound channel along a fourth direction, wherein the fourth direction is opposite to the third direction.

9. The audio output device according to claim 8, wherein each of the rib structures of the upper sound guiding structure has a first protrusion height in the third direction, and the first protrusion height increases along the first direction to a highest point, and then decreases towards the sound outlet; and wherein each of the rib structures of the lower sound guiding structure has a second protrusion height in the fourth direction, and the second protrusion height increases along the first direction to a highest point, and then decreases toward the sound outlet.

10. The audio output device according to claim 7, wherein the first plate and the upper sound guiding structure are an integrally formed structure, and the second plate and the lower sound guiding structure are an integrally formed structure.

11. The audio output device according to claim 1, wherein the sound channel between the first plate and the second plate has a first height on a side adjacent to the speaker unit, and the sound channel between the first plate and the second plate has a second height on a side farther away from the speaker unit, wherein the first height is equal to the second height.

12. The audio output device according to claim 1, wherein the sound channel between the first plate and the second plate has a first height on a side adjacent to the speaker unit, and the sound channel between the first plate and the second plate has a second height on a side farther away from the speaker unit, wherein the first height is different from the second height.

13. The audio output device according to claim 12, wherein the first height is smaller than the second height.

14. The audio output device according to claim 12, wherein the first height is greater than the second height.

15. The audio output device according to claim 1, wherein an extension line extending from the center point of the sound-emitting surface along a normal direction of the sound-emitting surface passes through the sound outlet.

16. The audio output device according to claim 1, wherein an extension line extending from the center point of the sound-emitting surface along a normal direction of the sound-emitting surface is separated from the sound outlet.

17. An electronic device, comprising:
a case; and
an audio output device connected to the case, wherein the audio output device comprises:
a speaker unit having a sound-emitting surface, and the sound-emitting surface has a first side and a second side opposite to each other;
a first plate, a first side edge of the first plate corresponding to the first side and rotatably connected;
a second plate, a second side edge of the second plate corresponding to the second side and rotatably connected, wherein a sound channel corresponding to the speaker unit is formed between the first plate and the second plate, and a sound outlet is formed at an end of the sound channel farthest away from the speaker unit, wherein a direction pointed by a connection line between a center point of the sound-emitting surface and a center point of the sound outlet is adjustable.

18. The electronic device according to claim 17, wherein the sound channel between the first plate and the second plate has a first height on a side adjacent to the speaker unit, and the sound channel between the first plate and the second plate has a second height on a side farther away from the speaker unit, wherein the first height is different from the second height.

19. The electronic device according to claim 17, wherein the first plate has a lower surface corresponding to the sound channel, and the second plate has an upper surface corresponding to the sound channel, wherein the audio output device further comprises an upper sound guiding structure and a lower sound guiding structure, the upper sound guiding structure is disposed on the lower surface and protrudes toward the sound channel; the lower sound guiding structure is disposed on the upper surface, and protrudes toward the sound channel.

20. The electronic device according to claim 19, wherein the upper sound guiding structure comprises at least two rib structures, and the lower sound guiding structure comprises at least two rib structures, wherein the at least two rib structures of the upper sound guiding structure extend along the first direction on the lower surface, and are separated from each other along a second direction, and protrude toward the sound channel along a third direction, wherein the first plate has a first extension direction extending in a direction farther away from the speaker unit, the first direction is parallel to the first extension direction, and the first direction, the second direction, and the third direction are intersected with each other;

wherein the at least two rib structures of the lower sound guiding structure extend along the first direction on the upper surface, and are separated from each other along the second direction, and protrude toward the sound channel along a fourth direction, wherein the fourth direction is opposite to the third direction.

* * * * *